(12) United States Patent
Nickols et al.

(10) Patent No.: US 11,999,457 B1
(45) Date of Patent: Jun. 4, 2024

(54) PENDULUM MASS DAMPER HUB PROPELLER ASSEMBLY FOR MARINE DRIVES

(71) Applicant: Brunswick Corporation, Mettawa, IL (US)

(72) Inventors: Thomas F. Nickols, Fond du Lac, WI (US); Robert A. Podell, Slinger, WI (US); Paul M. Radavich, Eldorado, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 17/898,038

(22) Filed: Aug. 29, 2022

(51) Int. Cl.
| | | |
|---|---|---|
| *B63H 1/15* | (2006.01) | |
| *B63H 1/20* | (2006.01) | |
| *B63H 21/30* | (2006.01) | |
| *F16F 15/14* | (2006.01) | |
| *B63H 23/34* | (2006.01) | |

(52) U.S. Cl.
CPC ............. *B63H 1/15* (2013.01); *B63H 1/20* (2013.01); *B63H 21/30* (2013.01); *F16F 15/14* (2013.01); *B63B 2231/04* (2013.01); *B63H 2023/342* (2013.01)

(58) Field of Classification Search
CPC .. B63H 1/15; B63H 1/20; B63H 21/30; F16F 15/14
See application file for complete search history.

(56) References Cited

U.S. PATENT DOCUMENTS

| | | | | |
|---|---|---|---|---|
| 2,079,226 | A | | 5/1937 | Sarazin |
| 2,346,972 | A | | 4/1944 | Kishline |
| 2,379,255 | A | * | 6/1945 | Rubissow ............... F16F 15/14 |
| | | | | 74/574.3 |
| 2,387,776 | A | * | 10/1945 | Salomon ............... F16F 15/145 |
| | | | | 74/574.2 |
| 2,664,763 | A | | 1/1954 | Sarazin |
| 4,701,151 | A | * | 10/1987 | Uehara ..................... F16D 3/76 |
| | | | | 416/169 R |
| 4,787,868 | A | | 11/1988 | Hoshiba et al. |
| 5,240,374 | A | * | 8/1993 | Speer ..................... B63H 3/008 |
| | | | | 416/89 |
| 5,326,223 | A | * | 7/1994 | Speer ..................... B63H 3/008 |
| | | | | 416/89 |

(Continued)

*Primary Examiner* — Eldon T Brockman
(74) *Attorney, Agent, or Firm* — Andrus Intellectual Property Law, LLP

(57) ABSTRACT

A propeller hub assembly for a marine drive having a propeller shaft is provided. The propeller hub assembly includes a first hub portion having a first main body and multiple propeller blades extending radially therefrom, a second hub portion, wherein the second hub portion is coupled to the first hub portion, and a damper hub portion, wherein the damper hub portion is coupled to the second hub portion. The propeller hub assembly further includes multiple pendulum masses located within the damper hub portion. The first hub portion, the second hub portion, and the damper hub portion are configured to engage the propeller shaft such that rotation of the propeller shaft causes rotation of the first hub portion, the second hub portion, and the damper hub portion. Oscillations of the pendulum masses relative to the damper hub portion are configured to dampen torsional vibrations of the propeller hub assembly.

20 Claims, 6 Drawing Sheets

(56) References Cited

U.S. PATENT DOCUMENTS

| | | | |
|---|---|---|---|
| 5,484,264 A | | 1/1996 | Karls et al. |
| 5,884,735 A | * | 3/1999 | Eckel .................... F16F 15/145 |
| | | | 267/136 |
| 6,024,615 A | | 2/2000 | Eichinger |
| 6,478,543 B1 | | 11/2002 | Tuchscherer et al. |
| 9,695,904 B2 | | 7/2017 | Meyer et al. |
| 9,915,317 B2 | | 3/2018 | Ulbrich et al. |
| 10,336,419 B1 | | 7/2019 | Guse et al. |
| 10,875,615 B1 | | 12/2020 | Monroe et al. |
| 2010/0035489 A1 | * | 2/2010 | Duncan ................ B63H 21/305 |
| | | | 440/75 |

* cited by examiner

PENDULUM MASS DAMPER HUB PROPELLER ASSEMBLY FOR MARINE DRIVES

FIELD

The present disclosure relates to marine drives, and more particularly, to a pendulum mass damper hub propeller assembly that mounts to a propeller shaft of a marine drive.

BACKGROUND

The Background is provided to introduce a foundation and selection of concepts that are further described below in the Detailed Description. The Background is not intended to identify key or essential features of the claimed subject matter, nor is it intended to be used as an aid in limiting the scope of the claimed subject matter.

U.S. Pat. No. 5,484,264 discloses a marine drive having a drive sleeve and a drive sleeve adapter between the propeller shaft and the propeller hub where the drive sleeve absorbs the shock of the propeller striking an object by torsionally twisting a forward end of the drive sleeve which is keyed to the propeller hub and where the adapter is keyed to the propeller shaft and the drive sleeve is keyed to the adapter. The combination provides both high load capability and shock protection.

U.S. Pat. No. 6,024,615 discloses a vibration dampening system that incorporates an inertia mass that is disposed within a hollow portion of an impeller structure. The inertia mass is attached to one or more elastomeric members which are, in turn, attached to an inside surface of a tubular portion of the impeller structure. The annular inertia mass and its elastomeric legs are particularly designed to dampen and counteract a particular frequency at which the propulsion system vibrates when the internal combustion engine is operated at idle speed.

U.S. Pat. No. 6,478,543 discloses a torque transmitting device for use in conjunction with a marine propulsion system provides an adapter that is attached in torque transmitting relation with a propulsor shaft for rotation about a central axis of rotation. The first insert portion is attached in torque transmitting relation with the adapter and a second insert portion is attached in torque transmitting relation with a hub of the propulsor hub which can be a marine propeller or an impeller. A third insert portion is connected between the first and second insert portions and is resilient in order to allow the first and second insert portions to rotate relative to each other about the central axis of rotation. The adapter is shaped to prevent compression of the first, second, and third insert portions in a direction parallel to the central axis of rotation. The relative shapes of the various components and the resilience of the third insert portion, which can be a plurality of titanium rods, provides significant compliance of the device under low torque magnitudes, but at higher torque magnitudes it provides a significantly decreased compliance to facilitate torque transfer between a propulsor shaft and the propulsor hub.

U.S. Pat. No. 10,336,419 discloses shock absorbing hub assemblies and methods of making the same for marine propulsion devices having a propeller shaft and propeller. The assembly has an adapter component having an inner bore that engages the propeller shaft's splined outer surface and having a body with axially extending engagement surfaces on one end and an elastic hub component on an opposite end. The elastic hub component has planar outer engagement surfaces that abut corresponding inner engagement surfaces on the propeller hub's inner bore. Upon initial propeller shaft rotation, the elastic hub component deflects and allows the adapter component to rotationally travel relative to the propeller hub while not rotating the propeller hub. Upon further rotation, the adapter component's axially extending engagement surfaces engage with the propeller hub to rotate the propeller hub. The elastic hub component has a spring rate small enough to reduce clutch rattle yet large enough to isolate transmission shift clunk.

U.S. Pat. No. 10,875,615 discloses a method of making a propeller includes forming the propeller to have blades coupled to an outer hub, the outer hub coupled to an inner hub via ribs, and the inner hub configured to be coupled to the marine vessel. The ribs each have first and second ends with a midpoint therebetween, an inner end and an outer end that define a width therebetween, and a leading surface and a trailing surface that define a thickness therebetween. The ribs are tapered such that the thickness is greater at the midpoint than at least at one of the first end and the second end, and scalloped such that the width is greater at the midpoint than at least at one of the first end and the second end. Each of the ribs is coupled to the outer hub in radial alignment with one of the blades.

Each of the above patents is hereby incorporated herein by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a propeller hub assembly for a marine drive having a propeller shaft is provided. The propeller hub assembly includes a first hub portion having a first main body and multiple propeller blades extending radially therefrom, a second hub portion, wherein the second hub portion is coupled to the first hub portion, and a damper hub portion, wherein the damper hub portion is coupled to the second hub portion. The propeller hub assembly further includes multiple pendulum masses located within the damper hub portion. The first hub portion, the second hub portion, and the damper hub portion are configured to engage the propeller shaft such that rotation of the propeller shaft causes rotation of the first hub portion, the second hub portion, and the damper hub portion. Oscillations of the pendulum masses relative to the damper hub portion are configured to dampen torsional vibrations of the propeller hub assembly.

According to another example of the present disclosure, a marine drive includes a driving element that drives a propeller shaft and propeller hub into rotation. The propeller hub includes a first hub portion having a first main body and multiple propeller blades extending radially therefrom, a second hub portion, wherein the second hub portion is coupled to the first hub portion, and a damper hub portion, wherein the damper hub portion is coupled to the second hub portion. The propeller hub further includes multiple pendulum masses located within the damper hub portion. The first hub portion, the second hub portion, and the damper hub portion are configured to engage the propeller shaft such that rotation of the propeller shaft causes rotation of the first hub portion, the second hub portion, and the damper hub portion.

Oscillations of the pendulum masses relative to the damper hub portion are configured to dampen torsional vibrations of the propeller hub.

According to a further example of the present disclosure, a propeller hub assembly for a marine drive having a propeller shaft is provided. The propeller hub assembly includes one or more hub portions having multiple propeller blades, a damper hub portion, wherein the damper hub portion is coupled to the one or more hub portions, a damper hub cover that is coupled to the damper hub portion to form a sealed region, and multiple pendulum masses located within the sealed region. The one or more hub portions and the damper hub portion are configured to engage the propeller shaft such that rotation of the propeller shaft causes rotation of the one or more hub portions and the damper hub portion, and oscillations of the pendulum masses relative to the damper hub portion are configured to dampen torsional vibrations of the propeller hub assembly.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

When a rotatable device such as a propeller hub on a marine drive is driven by a source of motive power (e.g., an electric motor, and internal combustion engine), there are many possible sources of vibration that can cause noise at certain frequencies. For example, fluctuations in the rotational velocity of a rotating component, otherwise known as torsional vibration, may be generated by the propeller blades and associated with the number of blades included on the propeller hub. In other words, if the propeller hub includes three propeller blades, three torque pulses or fluctuations in the rotational velocity of the propeller shaft are generated per revolution of the shaft. In addition, vibrations may further be generated by the electric motor or internal combustion engine, propeller surfacing events, wave-hop impacts, rough water, and trailering loads. Proper damping may reduce the noise, vibration, and harshness characteristics of the marine drive, thus creating an improved environment for the occupants of the vessel on which the marine drive is installed.

Existing solutions to reducing torsional vibrations of the propeller hub include the use of passive rubber dampers or isolators within the propeller hub design. However, such solutions are not well-suited to filtering of particular order-based vibrations, and may result in over-softening of the system, leading to steering control and vessel handling problems. The present inventors have therefore recognized that an actively damped propeller hub comprising pairs of pendulum mass dampers enables the selective damping of particular orders without degradation of the steering and handling capabilities of the vessel.

Figure 1:
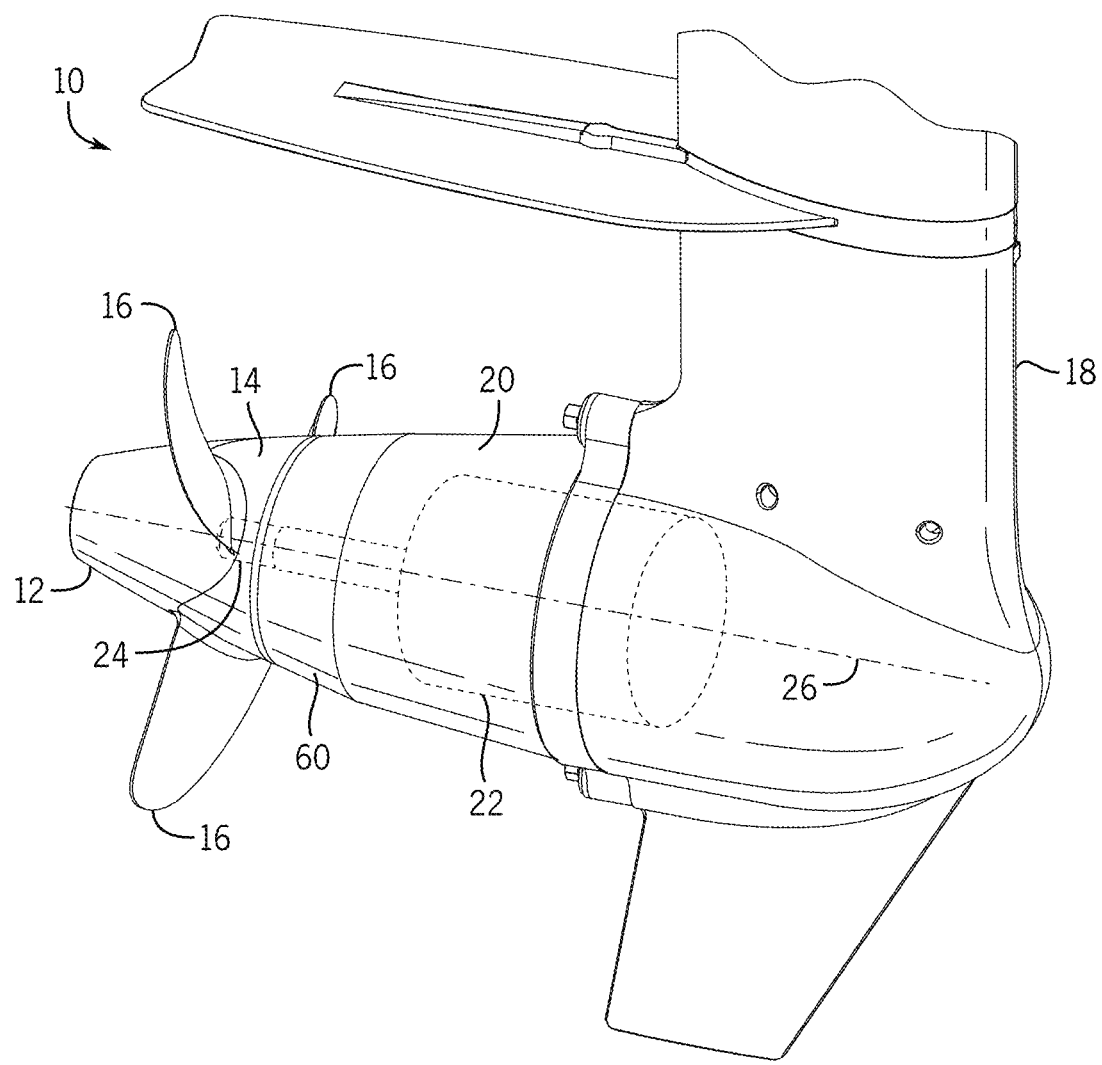
FIG. 1 is a perspective view of a pendulum mass damper hub propeller assembly as installed on an outboard motor.

FIG. 1 depicts a lower portion of a marine drive according to an exemplary embodiment of the present invention, which in the illustrated example is an outboard motor. The exemplary outboard motor includes a driving element (e.g., an internal combustion engine or electric motor) that causes rotation of a vertically extending driveshaft (not shown) into a first torpedo housing component 18. The lower end of the driveshaft is engaged via a propeller shaft bearing hub 22 located in the first torpedo housing component 18 and a second torpedo housing component 20 to a propeller shaft 24. The propeller shaft 24 extends laterally from the bearing hub 22 and is configured to rotate about shaft axis 26.

The propeller shaft 24 supports a pendulum mass damper hub propeller assembly 10 having a first hub portion 12, a second hub portion 14, and a damper hub portion 60 that are joined to each other, as will be described in further detail below. The propeller assembly 10 is configured to impart propulsive forces via blades 16 on the body of water in which the outboard motor is operating. Although FIG. 1 depicts an outboard motor, the concepts of the present disclosure are also applicable to other types of marine drives, including alternatively configured outboard motors, inboard motors, stern drives, and/or the like. In addition, although the propeller assembly of the present application is particularly suited to implementation with marine drives utilizing electric motors, the concepts described herein may also be implemented in marine drives that utilize traditional internal combustion engines.

Figure 2:
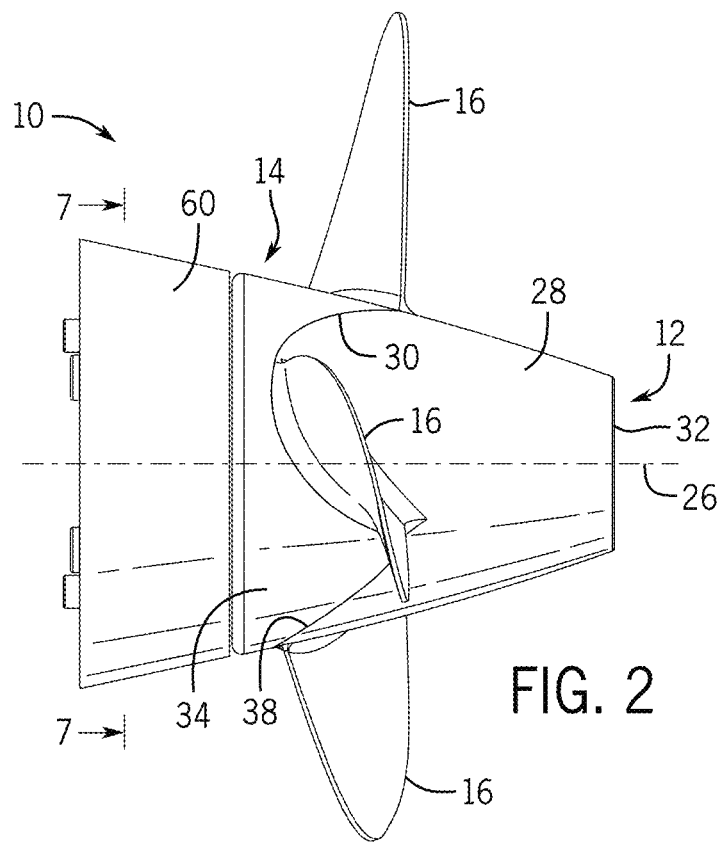
FIG. 2 is a side view of the pendulum mass damper hub propeller assembly of FIG. 1.
Figure 3:
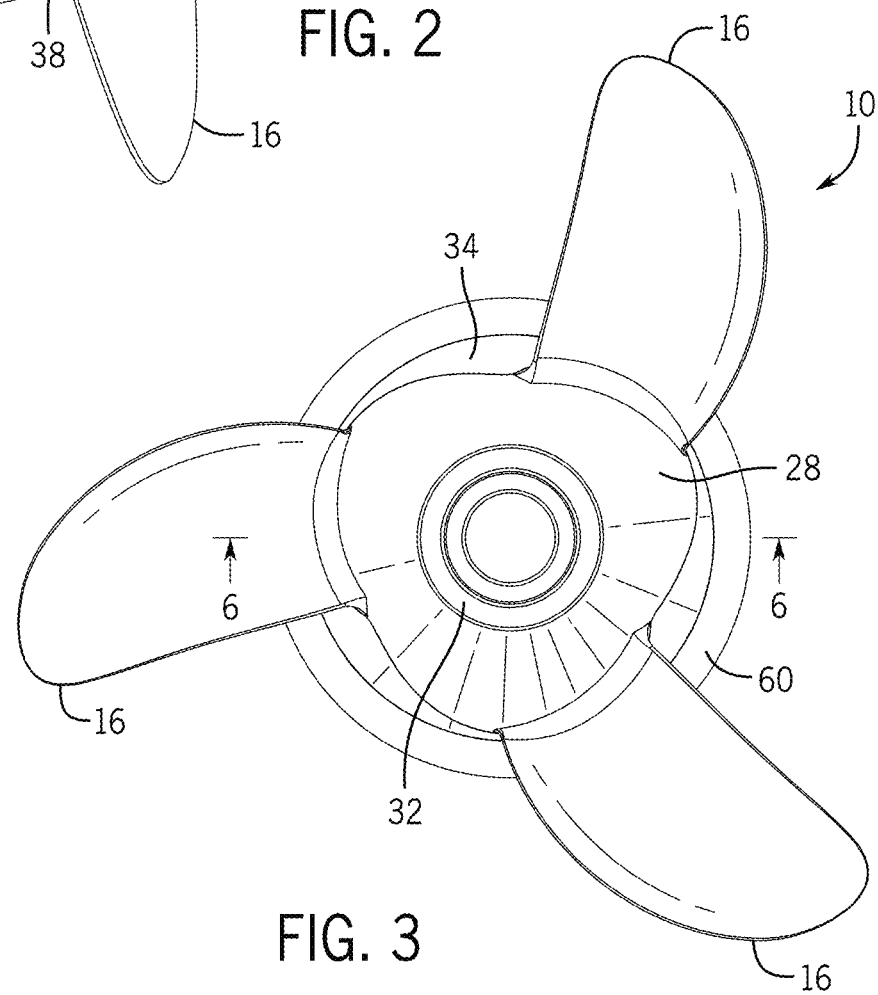
FIG. 3 is a rear view of the pendulum mass damper hub propeller assembly of FIG. 1.
Figure 4:
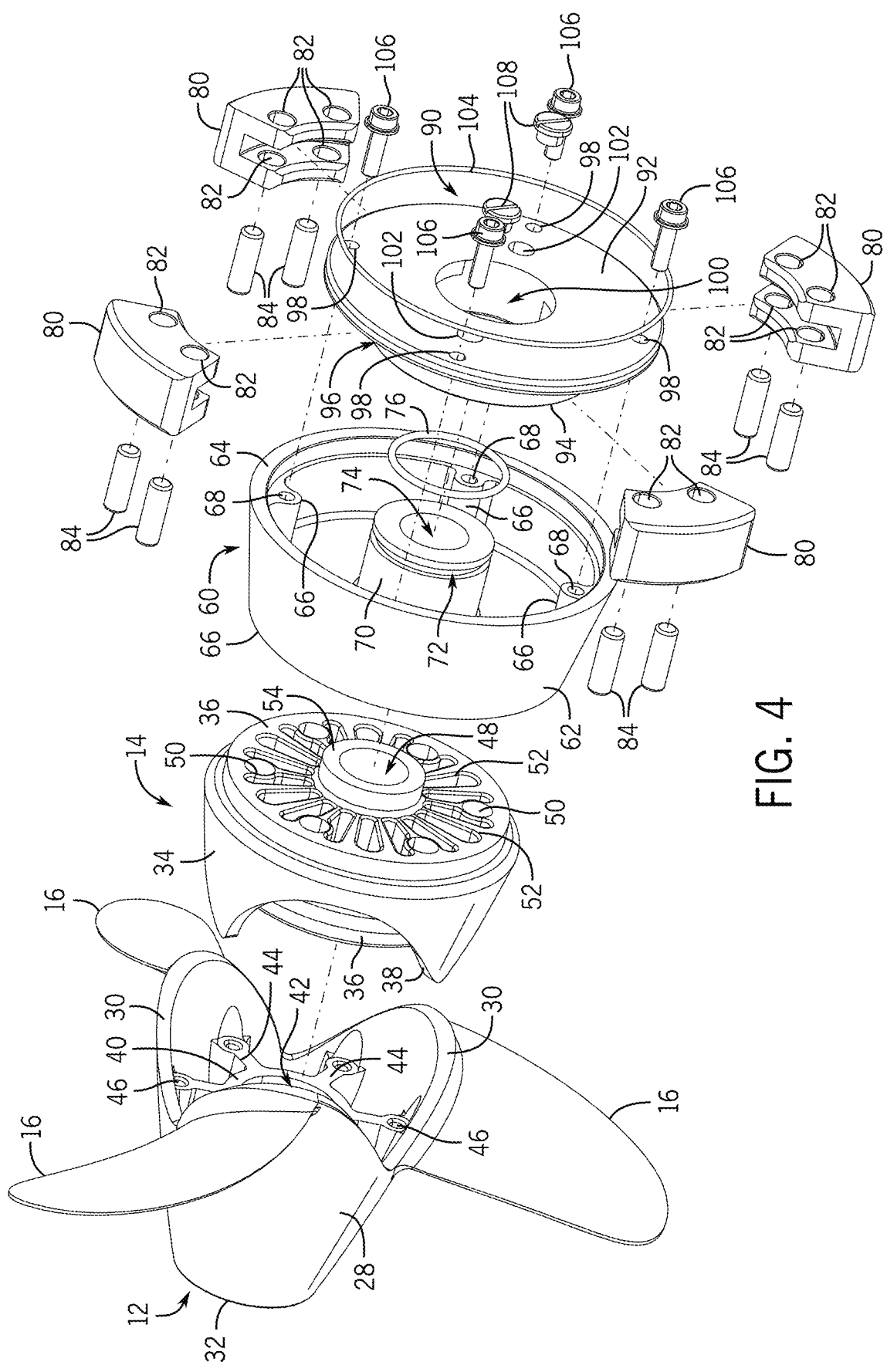
FIG. 4 is a perspective exploded view of the pendulum mass damper hub propeller assembly of FIG. 1.
Figure 5:
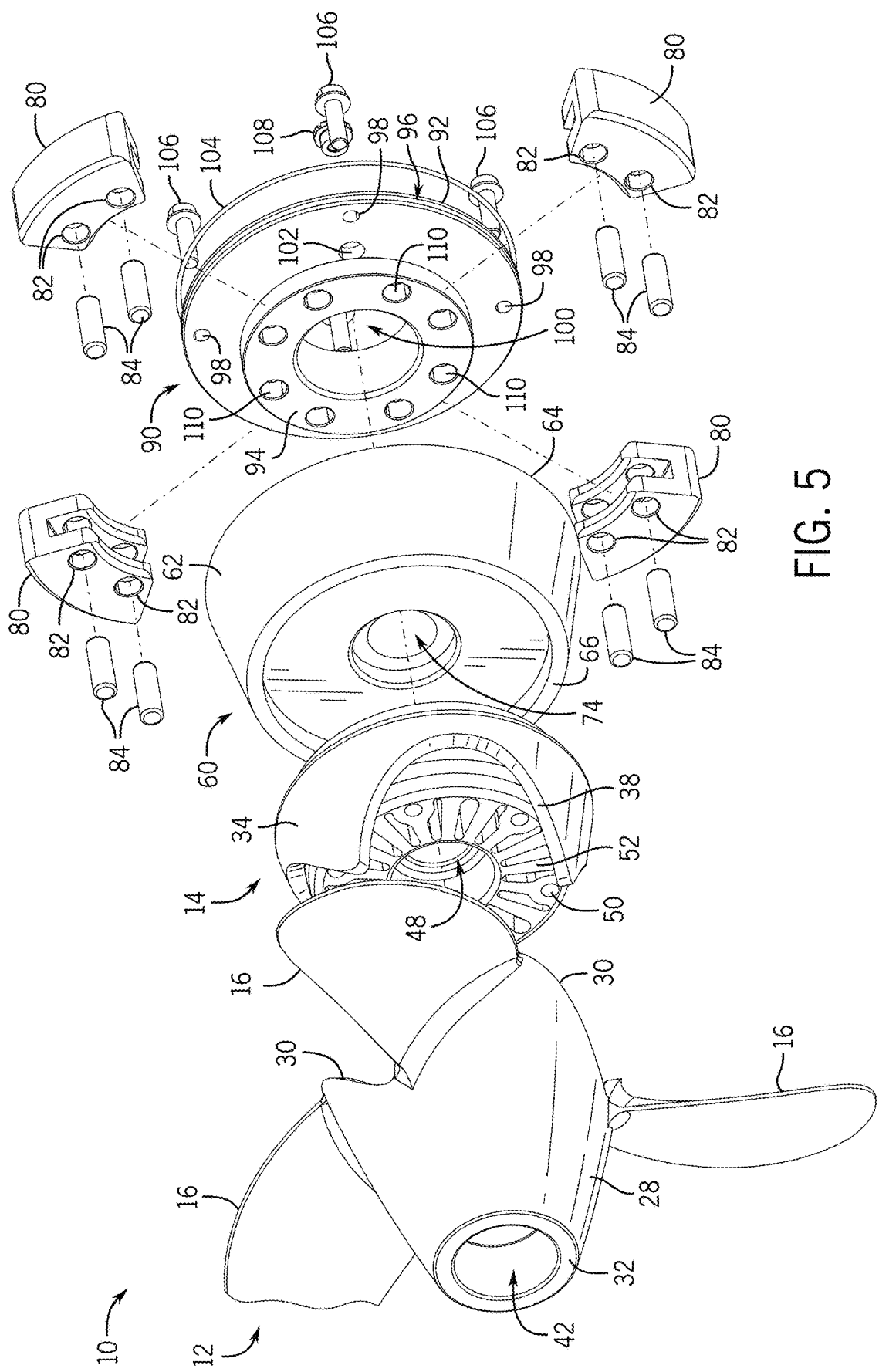
FIG. 5 is another perspective exploded view of the pendulum mass damper hub propeller assembly of FIG. 1.

Turning now to FIGS. 2-5, various views of the propeller assembly 10 are depicted. Specifically, FIGS. 2 and 3 respectively depict side and rear views of the assembly 10 in its assembled state in which the first hub portion 12 is joined to the second hub portion 14, and the damper hub portion 60 is joined to the second hub portion 14, while FIGS. 4 and 5 depict exploded views of the assembly 10.

The first hub portion 12 has a main hub body 28 from which multiple blades 16 extend in a radial direction. Although the FIGURES depict the first hub portion 12 as including three blades, there is no limitation as to the number of blades 16 and their shape. The main hub body 28 is shown to have a generally conical shape that tapers inwardly from a first parting line surface 30 that comprises the largest outer diameter of the first hub portion 12 to a terminating surface 32 that comprises the smallest outer diameter of the first hub portion 12. The second hub portion 14 has a main hub body 34 and is shown to extend from a mating surface of an inner body 36 to a second parting line surface 38. As will be described in further detail below, the parting line surfaces 30, 38 are formed along the parting lines where mold components are joined during the exemplary die casting process utilized to fabricate the propeller hub assembly 10. In an exemplary implementation, the parting line surface 30 of the first hub portion 12 is not flat but instead is contoured to match the curves of the propeller blades 16. The parting line surface 38 of the second hub portion 14 includes matching contours to the parting line surface 30 such that the parting line surfaces 30, 38 act as keying ends to aid in the successful mating of the first hub portion 12 to the second hub portion 14. In other implementations, the parting line surfaces 30, 38 could have a different key shape.

When the first hub portion 12, the second hub portion 14, and the damper hub portion 60 are coupled to each other, as is shown in FIGS. 1-3, the hub assembly 10 generally forms a continuous teardrop or torpedo shape with the gearcase housing components 18-20. The present inventors have recognized that such a shape is hydrodynamically advantageous, as drag induced by the gearcase and propeller is minimized. Reducing drag can decrease the fuel or power consumed by the internal combustion engine or electric motor that drives the propeller shaft, thereby increasing the range of the marine vessel and the intervals between refueling or recharging.

Referring now specifically to FIGS. 4 and 5, the interior region of the first hub portion 12 is visible and is shown to include an inner bore body 40 that surrounds a central bore 42. Multiple spokes 44 are shown to extend from the inner bore body 40 and terminate at the main hub body 28. The spokes 44 may be configured to passively absorb vibrations of propeller shaft 24 that are imparted to the inner bore body 40 and prevent them from being transmitted to the main hub body 28 and the propeller blades 16. Each of the spokes 44 is shown to include a mounting hole 46 formed near the hub body 28. In an exemplary implementation, the mounting holes 46 are threaded holes configured to receive threaded fasteners (see FIG. 6).

The second hub portion 14 is shown to include the main hub body 34 and the inner body 36. The inner body 36 includes a central bore 48 with multiple mounting holes 50 and spokes 52 arranged in a radial pattern around the central bore 48. The mounting holes 50 may be through holes configured to permit the passage of fasteners that are threadably coupled to the mounting holes 46 in the first hub portion 12. Although the first hub portion 12 and the second hub portion 14 are shown to include six mounting holes 46, 50, any number of mounting holes required to securely fasten the first hub portion 12 to the second hub portion 14 may be utilized. The spokes 52 may be configured to reduce the overall weight of the second hub portion 14 and, like the spokes 44 of the first hub portion 12, absorb vibrations of the propeller shaft 24 to prevent their transmission to the propeller blades 16. The number of spokes 52 is not particularly limited.

Figure 6:
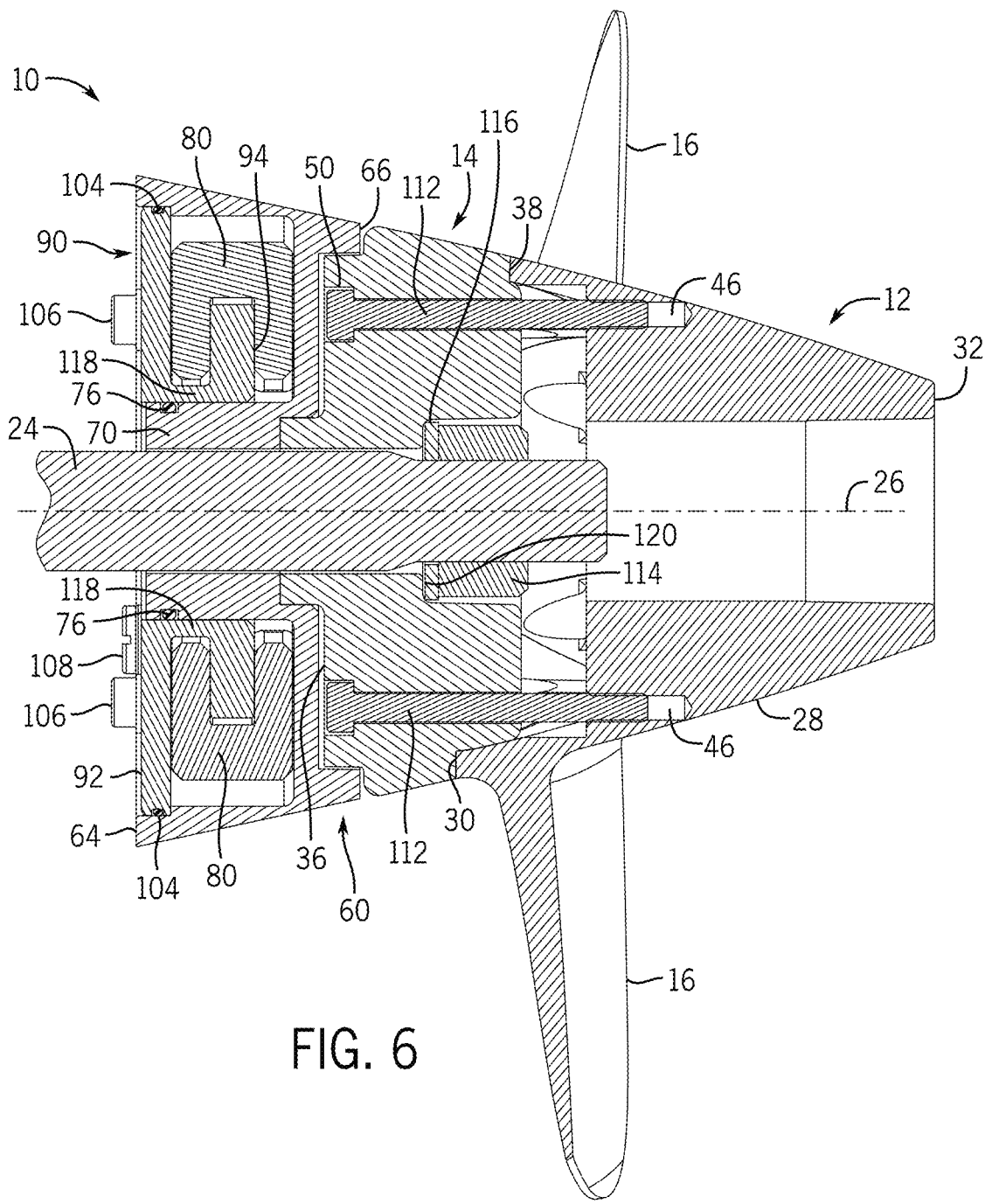
FIG. 6 is a side cross-sectional view of the pendulum mass damper hub propeller assembly taken along the line 6-6 of FIG. 3.

The damper hub portion 60 is shown to include a main hub body 62 that extends from a fore mating surface 64 that is configured to be positioned proximate the second torpedo housing component 20 (see FIG. 1) to an aft mating surface 66 that is configured to be positioned proximate the second hub portion 14 (see FIG. 6). The main hub body 62 has a generally frustoconical shape, with the fore mating surface 64 having a larger outer diameter than the aft mating surface 66 in keeping with the hydrodynamically advantageous teardrop shape of the hub assembly 10. The main hub body 62 is further shown to include multiple mounting bosses 66 distributed about an interior region of the main hub body 62. Each of the mounting bosses 66 includes a mounting hole 68 formed therein. As described in further detail below, the mounting holes 68 may be threaded holes configured to receive threaded fasteners (e.g., damper hub bolts 106) that couple a damper hub cover portion 90 to the main hub body 62 to form a sealed or semi-sealed region between the damper hub cover portion 90 and the main hub body 62. Although the FIGURES depict the main hub body 62 as including four mounting bosses 66 with associated mounting holes 68 equally distributed about the main hub body 62, the number of mounting bosses 66 and mounting holes 68 is not particularly limited.

Referring specifically to FIG. 4, the damper hub portion 60 is further shown to include a generally cylindrically-shaped inner body 70 with a central opening 74 formed therethrough. The central opening 74 permits the propeller shaft 24 to extend through the damper hub portion 60 (see FIG. 6) to drive rotation of the hub assembly 10. As described in further detail below, in an exemplary implementation, the inner body 70 includes a gland 72 that is configured to receive a first sealing body (e.g., O-ring 76) to seal the region between the damper hub cover portion 90 and the main hub body 62 and prevent leakage of a cooling fluid when the damper hub cover portion 90 is coupled to the main hub body 62.

The damper hub cover portion 90 is shown to include an outer flange 92 and an inner flange 94. The flanges 92, 94 are coupled to each other via a connecting portion 118 (see FIG. 6). A central opening 100 is formed through the flanges 92, 94 and the connecting portion 118 to permit the inner body 70 of the damper hub portion 60 to fit within the central opening 100 such that the cover portion 90 nests within the main hub body 62 when the hub assembly 10 is fully assembled. The outer flange 92 has a larger diameter than the inner flange 94 and is shown to include a gland 96 that is configured to receive a second sealing body (e.g., O-ring 104) to further seal the region between the damper hub cover portion 90 and the main hub body 62. The outer flange 92 further includes four cover portion mounting holes 98 and two cooling fluid sealing holes 102. The cover portion mounting holes 98 are configured to permit the damper hub bolts 106 to extend through the outer flange 92 and threadably couple to mounting holes 68, thereby coupling the damper hub cover portion 90 to the main hub body 62.

Multiple pendulum masses 80 are provided and configured to couple to the inner flange 94 of the damper hub cover portion 90 such that the masses can oscillate freely in the direction of rotation of the hub assembly 10 as driven by the propeller shaft 24. When a torsional fluctuation is experienced by the hub assembly 10 due to the rotation of the propeller blades 16 or due to the electric motor driving the propeller shaft 24, the inertia of the pendulum masses 80 in the direction opposite the direction of the torsional vibration results in a pendulum force that counteracts and absorbs the high energy peaks of the torsional vibration. The energy stored by the pendulum masses 80 is returned to the system during the low energy troughs of the torsional vibration, thereby flattening the overall effects of the torsional vibration on the system. In an exemplary embodiment, the pendulum masses 80 may have a generally U-shaped cross section (see FIG. 6) such that a first lobe of each U-shape is configured to fit on a first side of the inner flange 94, and a second lobe of each U-shape is configured to fit on a second side of the inner flange 94 opposite the first side.

Each of the masses 80 is shown to include a pair of through holes 82. The through holes 82 are configured to be aligned with pendulum mass mounting holes 110 located on the inner flange 94, and pins 84 are configured to be inserted through holes 82, 110 to retain the masses 80 in a coupled state with the inner flange 94. As described below with reference to FIG. 7, the relative sizes of the through holes 82 and the pendulum mass mounting holes 110 may be selected such that the masses 80 are able to oscillate relative to the inner flange 94 while still remaining coupled to the inner flange 94 via the pins 84. As shown in FIGS. 4 and 5, in an exemplary implementation, the pins 84 may be dowel pins with chamfered or rounded ends to aid the insertion of the pins 84 through holes 82, 110.

Lubricating oil or another type of fluid may be located within the damper hub portion 60 and surrounding the pendulum masses 80 when the cover portion 90 is coupled to the main hub body 62. The lubricating oil may ensure that the pendulum masses 80 can freely oscillate relative to the inner flange 94 of the cover portion 90 and dampen the torsional vibrations induced by the propeller blades 16 and/or the propeller shaft 24. As the oscillations of the pendulum masses 80 can generate heat due to friction between the pendulum masses 80 and other components (e.g., mounting pins 84, inner flange 94), the presence of the lubricating oil within the damper hub 60 can further conduct heat from the pendulum masses 80 to the main hub body 62 of the damper hub portion 60. The present inventors have recognized that enhanced cooling is further achieved by housing the pendulum masses 80 within the damper hub portion 60 that is exposed to the body of water in which the marine drive resides, as opposed to a damper housing that is interior to the marine drive and not otherwise exposed to the body of water. In an exemplary embodiment, the lubricating oil may be filled and/or drained via a pair of drain holes 102 located on the outer flange 92 of the cover portion 90. Since the filling process may be performed while the axis of rotation (i.e., the shaft axis 26) of the hub assembly 10 is horizontal, one of the pair of holes 102 may be utilized for filling of the oil while the other of the pair of holes 102 remains open to permit the displacement of air and prevent overfill of the lubricating oil. Some amount of air is maintained within the hub 60 at all times since the lubricating oil will expand in volume as its temperature increases. To prevent leakage of the lubricating oil when active filling or draining is not occurring, the drain holes 102 may be plugged via fasteners 108.

FIG. 6 depicts a side cross-sectional view of the propeller assembly 10 including an exemplary coupling arrangement of the first hub portion 12, the second hub portion 14, and the damper hub portion 60. In this exemplary arrangement, the propeller shaft 24 is shown to extend through the central opening 74 of the damper hub portion 60 and the central opening 48 of the second hub portion 14. The propeller shaft 24 is secured against fastening surface 120 of the second hub portion 14 using washer 116 and nut 114, as is conventional. Frictional forces may be utilized to couple the damper hub portion 60 to the second hub portion 14, although in other embodiments, fasteners may be utilized. Fasteners 112 are shown to extend through mounting holes 50 in the second hub portion 14 into mounting holes 46 in the first hub portion 12 in order to couple the first hub portion 12 to the second hub portion 14. In an exemplary embodiment, the fasteners 112 are threaded fasteners (e.g., bolts) and the mounting holes 46 are threaded holes, although other types of fasteners (e.g., pins) may be utilized to couple the first hub portion 12 and the second hub portion 14 and transfer rotational movement of the propeller shaft 24 to the propeller assembly 10.

The materials utilized in the casting process for the first hub portion 12 and the second hub portion 14 are not particularly limited. In various embodiments, each of the first hub portion 12 and the second hub portion 14 may be cast from an aluminum alloy (e.g., Mercalloy®), polymer (e.g., a glass-filled polymer such as Celstran® PBT-GF50- 08 or Domonyl™ 1850R15H1U3 BK-7), or stainless steel (e.g., X7 ® alloy). In some embodiments, the first hub portion 12 and the second hub portion 14 may be casted from dissimilar materials having dissimilar properties (e.g., density values, compliance values, etc.). For example, the first hub portion 12 may be casted from an aluminum alloy (i.e., a heavier, less compliant, and more expensive material) and the second hub portion 14 may be casted from a polymer (i.e., a lighter, more compliant, and less expensive material). The damper hub portion 60 may be fabricated from a passivated stainless steel, while the cover 90 may be fabricated from a hardened steel. Such an arrangement of dissimilar materials may advantageously decrease the overall weight and/or cost of the propeller assembly 10. The pendulum masses 80 may be fabricated from a billet tungsten alloy (e.g., Mallory metal), a tungsten-derived powdered metal, or a sintered metal composite. Pins 84 used to couple the masses 80 to the inner flange 94 must be particularly hard-wearing, and thus may be fabricated from a heat-treatable steel (e.g., 02 tool steel).

Figure 7:
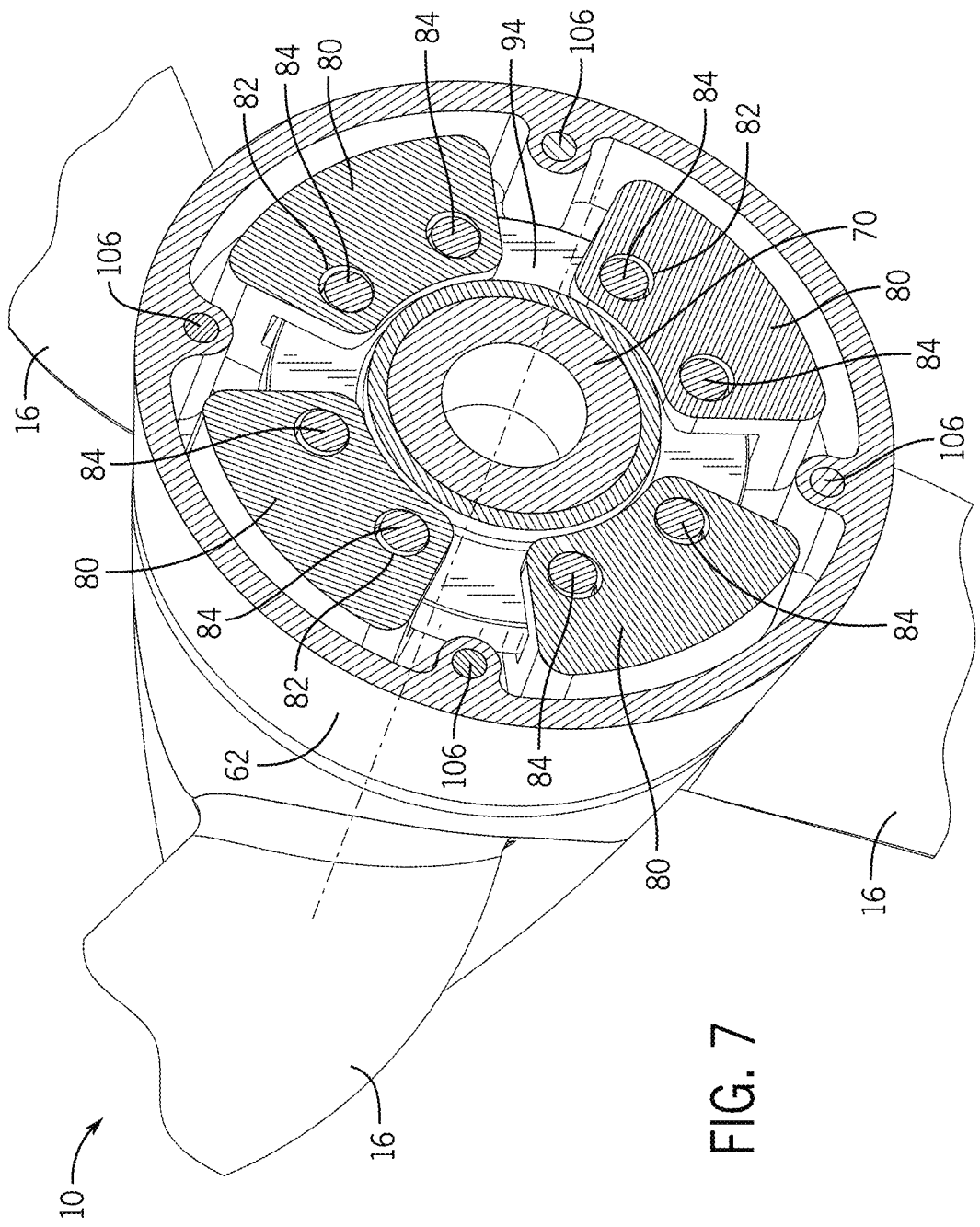
FIG. 7 is a front cross-sectional view of the pendulum mass damper hub propeller assembly taken along the line 7-7 of FIG. 2.

Referring now to FIG. 7, a cross-sectional view of the hub assembly 10 taken along the line 7-7 of FIG. 2 is shown. Specifically, FIG. 7 depicts the coupling of the pendulum masses 80 to the inner flange 94. As shown, the diameters of the pins 84 are smaller than the diameters of the through holes 82 of the pendulum masses 80. This clearance between the pins 84 and the through holes 82 is sufficient to permit movement of the masses 80 relative to the inner flange 94 to absorb torsional vibrations of the hub assembly 10. The amount of clearance is used to tune each of the pendulum masses 80 to a particular order. Since each mass 80 can only be tuned for one order, multiple masses 80 can capture multiple orders. Although the holes 82 of the masses 80 are shown to have a circular shape due to the ease of fabricating circular holes, in other embodiments, slots or arc-shaped openings may be formed through the masses 80 to increase the potential movement of the masses 80 relative to the inner flange 94.

Various modifications to the arrangement depicted in the FIGURES and described above are within the scope of the present invention. For example, in one alternative embodiment, the second hub portion 14 and the damper hub portion 90 may be fabricated as a single component that is coupled to the first hub portion 12. In addition, various methods of joining one or more of the components of the hub assembly 10, including, but not limited to, welding and bonding using adhesives may be used in place of or in addition to threaded fasteners.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A propeller hub assembly for a marine drive having a propeller shaft, the propeller hub assembly comprising:
    a first hub portion having a first main body and a plurality of propeller blades extending radially therefrom;
    a second hub portion, wherein the second hub portion is coupled to the first hub portion;
    a damper hub portion, wherein the damper hub portion is coupled to the second hub portion opposite the first hub portion; and a plurality of pendulum masses located within the damper hub portion;

wherein the first hub portion, the second hub portion, and the damper hub portion are configured to engage the propeller shaft such that rotation of the propeller shaft causes rotation of the first hub portion, the second hub portion, and the damper hub portion; and wherein oscillations of the plurality of pendulum masses relative to the damper hub portion are configured to dampen torsional vibrations of the propeller hub assembly.

2. The propeller hub assembly of claim 1, further comprising a damper hub cover that is coupled to the damper hub portion, wherein the damper hub cover comprises an inner flange, an outer flange, and a connecting portion located between the inner flange and the outer flange.

3. The propeller hub assembly of claim 2, wherein the plurality of pendulum masses are coupled to the inner flange using a plurality of pins.

4. The propeller hub assembly of claim 3, wherein each of the plurality of pendulum masses has a U-shaped cross-section with a first lobe and a second lobe, wherein the first lobe is located on a first side of the inner flange and the second lobe is located on a second side of the inner flange that is opposite the first side.

5. The propeller hub assembly of claim 2, wherein a sealed region is located between the damper hub portion and the damper cover.

6. The propeller hub assembly of claim 5, further comprising a lubricating oil within the sealed region.

7. The propeller hub assembly of claim 1, wherein the damper hub portion is fabricated from a metal.

8. The propeller hub assembly of claim 7, wherein the metal is hardened steel.

9. The propeller hub assembly of claim 1, wherein the first hub portion is fabricated from a first material, the second hub portion is fabricated from a second material, and the damper hub portion is fabricated from a damper hub material; and wherein the damper hub material is different from at least one of the first material and the second material.

10. The propeller hub assembly of claim 1, wherein the first hub portion and the second hub portion are fabricated using a casting process.

11. A marine drive comprising:
a driving element that drives a propeller shaft and propeller hub into rotation, the propeller hub comprising:
a first hub portion having a first main body and a plurality of propeller blades extending radially therefrom;
a second hub portion, wherein the second hub portion is coupled to the first hub portion;
a damper hub portion, wherein the damper hub portion is coupled to the second hub portion opposite the first hub portion; and
a plurality of pendulum masses located within the damper hub portion;

wherein the first hub portion, the second hub portion, and the damper hub portion are configured to engage the propeller shaft such that rotation of the propeller shaft causes rotation of the first hub portion, the second hub portion, and the damper hub portion; and wherein oscillations of the plurality of pendulum masses relative to the damper hub portion are configured to dampen torsional vibrations of the propeller hub.

12. The marine drive of claim 11, wherein the driving element is an electric motor.

13. The marine drive of claim 11, further comprising a damper hub cover that is coupled to the damper hub portion, wherein the damper hub cover comprises an inner flange, an outer flange, and a connecting portion located between the inner flange and the outer flange.

14. The marine drive of claim 13, wherein the plurality of pendulum masses are coupled to the inner flange using a plurality of pins.

15. The marine drive of claim 14, wherein each of the plurality of pendulum masses has a U-shaped cross-section with a first lobe and a second lobe, wherein the first lobe is located on a first side of the inner flange and the second lobe is located on a second side of the inner flange that is opposite the first side.

16. The marine drive of claim 13, wherein a sealed region is located between the damper hub portion and the damper cover.

17. The marine drive of claim 16, further comprising a lubricating oil within the sealed region.

18. A propeller hub assembly for a marine drive having a propeller shaft, the propeller hub assembly comprising:
one or more hub portions having a plurality of propeller blades;
a damper hub portion, wherein the damper hub portion is coupled to the one or more hub portions;
a damper hub cover that is coupled to the damper hub portion to form a sealed region; and
a plurality of pendulum masses located within the sealed region;
wherein the one or more hub portions and the damper hub portion are configured to engage the propeller shaft such that rotation of the propeller shaft causes rotation of the one or more hub portions and the damper hub portion; and
wherein oscillations of the plurality of pendulum masses relative to the damper hub portion are configured to dampen torsional vibrations of the propeller hub assembly.

19. The propeller hub assembly of claim 18, wherein the damper hub cover comprises an inner flange, an outer flange, and a connecting portion located between the inner flange and the outer flange.

20. The propeller hub assembly of claim 19, wherein the plurality of pendulum masses are coupled to the inner flange using a plurality of pins.

* * * * *